Sept. 2, 1930.    H. L. MEAD    1,774,608
ASPHALT FILLER
Filed May 9, 1925
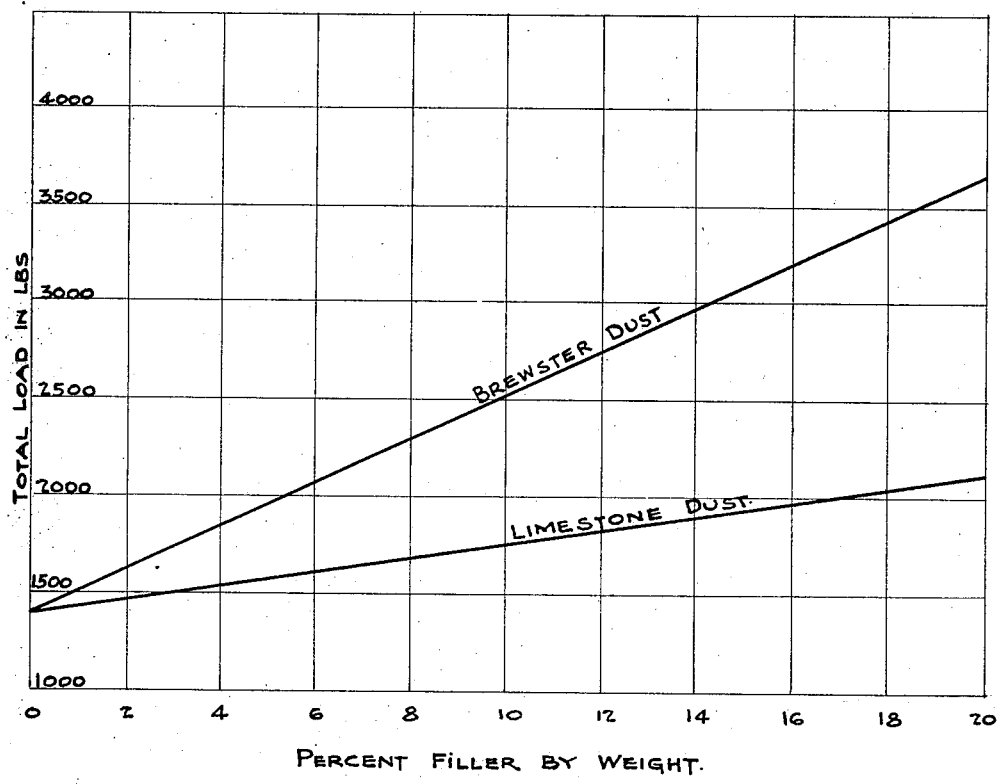
HARRY L MEAD.
INVENTOR.
BY *A. C. Bierman*
ATTORNEY.

Patented Sept. 2, 1930

1,774,608

UNITED STATES PATENT OFFICE

HARRY L. MEAD, OF BREWSTER, FLORIDA, ASSIGNOR TO AMERICAN CYANAMID COMPANY, OF NEW YORK, N. Y., A CORPORATION OF MAINE

ASPHALT FILLER

Application filed May 9, 1925. Serial No. 29,114.

This invention relates to asphalt and similar mixtures, more particularly to a filling material therefor.

Asphalt mixtures for paving and the like, generally consist of relatively coarse sand, sufficiently finely ground filler to fill the voids between the particles of sand and sufficient asphalt to coat substantially all the particles of both the coarse and fine material. Heretofore, the filler most commonly used was limestone, which was ground to such fineness that 75% to 80% thereof passed a 200 mesh screen. The ground limestone was satisfactory for the purpose in that suitable asphalt paving mixtures could be made therewith, but it is desirable to have a mixture having such characteristics that it will better withstand the wear and tear of traffic. Furthermore, the cost of grinding the limestone to 200 mesh is an expense which it is desirable to avoid.

It is, therefore, among the objects of my invention to provide a filler material for asphalt mixtures which shall be cheap and easily obtainable, and which is capable of imparting characteristics to the asphalt mixture which shall render it superior to mixtures made with a limestone filler.

In the hydraulic mining of the well-known pebble phosphate rocks of Florida, for instance, Brewster phosphate rock, there is obtained from the hydraulic stream, the principal product in the form of pebbles, and an intermediate product of the nature of sand. From the tailings of the stream there separates out an extremely finely divided mud or slime which, on account of its physical condition, was discarded as useless. Generally the fineness is such that over 90%, and often as much as 98% passes a 200 mesh screen, 75% may pass a 300 mesh screen and 40% may pass a 400 mesh screen.

I have found that if I take the above mentioned slime, suitably treat the same and then incorporate it in an asphalt mixture to replace the finely ground limestone previously used, a superior mixture results. The compressive strength thereof when the slime is used is much greater than when limestone is employed, both in the heated state and cold. As a result, the mixture is more stable at higher temperatures and tends to prevent excessive marking and rolling during the paving operation and in traffic.

In practicing my invention, I may take the tailings obtained from the hydraulic mining of Brewster rock, and allow the same to thicken to a sludge or even a solid mass. The material is pumped or scooped up by buckets and dewatered in a continuous Oliver filter, after which the resulting cake is dried in a rabble furnace. If the physical condition of the slime warrants it, the dewatering on the filter may be omitted and the material dried directly in the furnace. It is then broken up in a pulverizer or hammer mill and shipped in bulk or in bags to the point of use, where it is mixed in the proper proportions with dried sand and asphalt to give the desired mixture. The exact proportion of the Brewster dust used will vary with the type of service to which the paving is to be subjected.

A comparative series of tests was conducted with Brewster dust and limestone dust to show the physical characteristics of asphalt mixtures made therewith. The Brewster dust, 90% of which passed a 200 mesh screen, was composed principally of tricalcium phosphate and insoluble silicates and had a specific gravity of 2.64. The limestone dust consisted almost entirely of calcium carbonate and magnesium carbonate, having a specific gravity of 2.88. A standard grading of sheet asphalt sand mixed with 10% of asphalt, which showed a penetration of 50 at 77° F., was used. To this was added from 0 to 20% of the filler materials, and the mixtures were compressed while hot under a load of 55,000 pounds into cylinders measuring 2″ in diameter by 2″ high. After taking the specific gravity of the cylinders, they were subjected to compression in a standard compression machine at a temperature of 77° F. and the total maximum loads were recorded. The results of the tests are as follows:

| Per cent dust | Brewster dust | | | Limestone dust | | |
|---|---|---|---|---|---|---|
| | Total load | Specific gravity | Percent of voids | Total load | Specific gravity | Per cent of voids |
| 0 | 1383 | 2.13 | 8.0 | 1383 | 2.13 | 8.0 |
| 2 | 1660 | 2.16 | 6.6 | | | |
| 4 | 1893 | 2.17 | 6.0 | | | |
| 6 | 2160 | 2.18 | 5.5 | | | |
| 7 | 2171 | 2.18 | 5.1 | | | |
| 8 | 2325 | 2.20 | 4.9 | | | |
| 9 | 2482 | 2.20 | 4.7 | | | |
| 10 | 2450 | 2.20 | 4.4 | 1755 | 2.20 | 5.3 |
| 15 | 3020 | 2.22 | 3.5 | 1960 | 2.23 | 4.3 |
| 20 | 3663 | 2.23 | 3.0 | 2150 | 2.25 | 3.6 |

The accompanying drawing is a diagram showing the increased strength of mixtures made with the Brewster dust, the curves being compilations of the results set forth in the above table.

The Brewster dust produced mixtures which, under the same conditions, gave much higher results in compression than the limestone dust. While the specific gravity of limestone is higher, the relative densities of the asphalt mixtures were the same. As the filler is used primarily to fill the voids and stabilize the asphalt, 20% less by weight of Brewster dust may be used, on account of its fineness and lighter weight, to accomplish the filling of voids and stabilizing the mixture, with the added advantage of producing a stronger material. It was found that the compressive strength of both types of mixtures was approximately 50% lower at 115° F. than the same mixtures at 77° F., and since the Brewster dust imparts greater strength, it produces a mixture which is more stable at the higher temperatures.

It will be noted that Brewster dust is more economical to use because it fills the voids more completely, imparts greater strength to the mixture, and much smaller amounts thereof may be used to give the same results. It is cheaper to produce because it is a waste material which need only be dried and pulverized, whereas limestone is valuable and must be quarried and then ground to the desired fineness.

Although I have described my invention, setting forth a specific embodiment thereof, I am not limited to the details enumerated. For instance, I have described in detail the superiority of Brewster dust as a filler for asphalt mixtures. However, my invention contemplates the use of dusts, slimes or silts obtained from other sources. I may use phosphatic slimes from other localities and, in fact, although I prefer to use phosphatic materials because of their availability, other substances are also suitable, provided that they are in a finely divided state, and slimes obtained from other hydraulic mining operations, as well as those produced by nature, are suitable. These and other changes may be made in my invention, the scope of which is defined in the claims appended hereto.

What I claim is:

1. In an asphalt mixture including sand and asphalt, a filler comprising finely divided inorganic material containing a substantial proportion of phosphate lime.

2. In an asphalt mixture including sand and asphalt, a filler comprising finely divided inorganic material containing a substantial proportion of phosphate of lime, said material being of such fineness that over 90% passes through a 200 mesh screen.

3. In an asphalt mixture including sand and asphalt, a filler comprising finely divided inorganic material containing a substantial proportion of phosphate of lime, said material being of such fineness that over 90% passes through a 200 mesh screen and over 50% passes through a 300 mesh screen.

4. In an asphalt mixture including sand and asphalt, a filler comprising finely divided inorganic material containing a substantial proportion of phosphate of lime, said material being of such fineness that over 90% passes through a 200 mesh screen and about 75% passes through a 300 mesh screen.

5. In an asphalt mixture including sand and asphalt, a filler comprising finely divided inorganic material containing a substantial proportion of phosphate of lime, said material being of such fineness that over 90% passes through a 200 mesh screen, about 75% passes through a 300 mesh screen and about 40% passes through a 400 mesh screen.

6. In an asphalt mixture including sand and asphalt, a filler comprising finely divided inorganic material deposited from water suspension, and including a substantial proportion of phosphate of lime.

7. In an asphalt mixture including sand and asphalt, a filler comprising finely divided inorganic material deposited from water suspension and including a substantial proportion of phosphate of lime and insoluble silicates.

8. In an asphalt mixture including sand and asphalt, a filler comprising finely divided inorganic material containing a substantial proportion of phosphate of lime, said filler imparting at least 20% greater compressive strength to the mixture than an equal amount of a limestone filler.

9. In an asphalt mixture including sand and asphalt, a filler comprising finely divided inorganic material deposited from water suspension and consisting essentially of the tailings from the mining of phosphate pebble rock.

In testimony whereof, I have hereunto subscribed my name this 5th day of May, 1925.

HARRY L. MEAD.